United States Patent
Manin

(10) Patent No.: US 9,602,366 B1
(45) Date of Patent: Mar. 21, 2017

(54) SYSTEM AND METHOD FOR CORRECTING CLOCK DISCREPANCY IN SIMULTANEOUS NETWORK TRAFFIC CAPTURES

(75) Inventor: Dmitrii Yurievich Manin, Palo Alto, CA (US)

(73) Assignee: NetScout Systems, Inc., Westford, MA (US)

( * ) Notice: Subject to any disclaimer, the term of this patent is extended or adjusted under 35 U.S.C. 154(b) by 926 days.

(21) Appl. No.: 12/716,987

(22) Filed: Mar. 3, 2010

(51) Int. Cl.
G06F 15/173 (2006.01)
H04L 12/26 (2006.01)
G06F 1/10 (2006.01)
G06F 1/12 (2006.01)

(52) U.S. Cl.
CPC ............. H04L 43/04 (2013.01); G06F 1/10 (2013.01); G06F 1/12 (2013.01); H04L 43/10 (2013.01); H04L 43/106 (2013.01)

(58) Field of Classification Search
CPC ....... H04L 43/106; H04L 43/10; H04L 43/04; G06F 1/10; G06F 1/12
USPC ........................................................ 709/224
See application file for complete search history.

(56) References Cited

U.S. PATENT DOCUMENTS

| | | | | |
|---|---|---|---|---|
| 6,327,274 B1* | 12/2001 | Ravikanth | ............. | H04J 3/0664 370/516 |
| 6,335,931 B1* | 1/2002 | Strong | ...................... | G06F 1/14 370/390 |
| 7,865,760 B2* | 1/2011 | Carlson et al. | ............... | 713/503 |
| 8,055,612 B2* | 11/2011 | Barnett | ......................... | 707/609 |
| 2002/0143998 A1* | 10/2002 | Rajagopal et al. | ........... | 709/248 |
| 2004/0068583 A1* | 4/2004 | Monroe | ............. | H04N 1/32128 709/246 |
| 2005/0018694 A1* | 1/2005 | Mitani et al. | ................. | 370/396 |
| 2006/0265430 A1* | 11/2006 | Manin | ........................... | 707/201 |
| 2009/0184871 A1* | 7/2009 | Tofighbakhsh | .......... | 342/357.08 |

* cited by examiner

*Primary Examiner* — Anthony Mejia
*Assistant Examiner* — Herman Belcher
(74) *Attorney, Agent, or Firm* — Locke Lord LLP; Scott D. Wofsy; Christopher J. Capelli

(57) ABSTRACT

A system and method for correcting clock discrepancy in simultaneous network traffic data captures in a multi-tiered, multi-session environment. The invention uses intrinsic constraints imposed by the nature of the traffic onto the possible temporal sequence of the packets, The invention uses the intrinsic restraints of the network architecture and the protocols used at each segment along with the time stamps in the various segments to determine both an offset and scale correction to the clock readings (timestamps) in the traces in order to obtain a correct temporal sequence of packets when using multiple capture agents/engines/network monitors.

6 Claims, 6 Drawing Sheets

SYSTEM AND METHOD FOR CORRECTING CLOCK DISCREPANCY IN SIMULTANEOUS NETWORK TRAFFIC CAPTURES

FIELD OF THE INVENTION

The present invention relates to the field of application performance analysis and more particularly to troubleshooting by taking simultaneous traffic captures at multiple points in a network that have common or related traffic.

BACKGROUND OF THE INVENTION

Today's computer networks are extremely complex, with hundreds or more of applications, thousands or more of servers, hundreds or more of locations, hundreds of thousands of clients, and network traffic routed by numerous switches and routers on the computer networks. Network and application data collected from various parts of the network can provide insight into network conditions, but the enormous amount of data present a challenge for data storage, processing, and retrieval.

Network problems typically manifest themselves to end users as degradation of application performance. To detect such network problems, Sniffers™ and other devices are used to trace individual packets passing through the network to identify bottlenecks, routing problems, packet loss, etc.

Some techniques used to analyze the performance of a multi-tier applications include operating such an application in a controlled testing environment, where one client request is being processed by the application at a time. But such techniques may not be able to accurately ascertain that the downstream activity is actually caused by the observed client requests. Moreover, many problems associated with multi-tier applications do not appear except in a high-volume production environment, where many client requests are being processed at a time. Thus, processing one client request at a time may not be a feasible solution for analyzing a multi-tier application's performance. Other techniques establish the relationships between the transactions observed on both sides of an application based on knowledge of the application's complete model or internal structure. However, the feasibility of such techniques is usually limited to simple applications. A multi-tier application is an application that includes multiple interrelated sessions between multiple servers using multiple protocols.

More sophisticated troubleshooting techniques of network problems involves tracing packet paths, delays and transformations across the network as well as correlating multiple segments (legs) of complex sessions involving multiple interdependent servers, such as Web servers, database servers, authentications servers, etc. all cooperating in servicing a client request. Such network captures frequently need to be performed by multiple capture agents whose clocks can not be synchronized to the precision needed to reliably put the packets captured by different agents in the correct temporal sequence and evaluate time delays.

Conventional troubleshooting systems require a user input in the form of a clock difference between capture agents' (engines') clocks. This solution is not adequate however because (1) the user does not have a reliable way of determining the parameters, and (2) it does not address the differences in clock speeds, i.e., it only addresses (albeit poorly) the differences in clock offsets.

One conventional technique involves an automated method for correcting timelines in the specific situation where traffic (data in any form, e.g., packets, frames) traverses multiple segments. In that situation, the timestamp of each packet seen on two or more segments is constrained by its timestamps on other segments, so that if the order of traversal can be determined, a system of inequalities for timestamps can be built and solved. However, this solution does not address the case of multi-tier traffic where each leg of the application flow has no common packets with other legs.

SUMMARY OF THE INVENTION

The invention is a system and method for correcting clock discrepancy in simultaneous network traffic data captures. The invention uses intrinsic constraints imposed by the nature of the traffic onto the possible temporal sequence of the packets. One example is a request packet and its corresponding response packet. If a first trace (data capture at a first position) is closer to a first client than a second trace (data capture at a second position) then the request packet must be seen earlier on the first trace and the response packet must be seen earlier on the second trace. In a multi-tiered application where a data packet is not seen on all segments (legs), one example of which is where the multi-tiered application involves a first client that requests data from a first server and where the first server requests authentication from an authentication server and only after receiving authentication does the first server send a respond packet to the first client. The invention uses the intrinsic restraints of the network architecture and the protocols used at each segment along with the time stamps in the various segments to determine both an offset and scale correction to the clock readings (timestamps) in the traces in order to obtain a correct temporal sequence of packets when using multiple capture agents (engines).

In one embodiment the invention is a method for determining clock disparities between a first clock in a first network monitor positioned to capture first data in a first segment of a network and a second clock in a second network monitor positioned to capture second data in a second segment of the network, the method comprising the steps of receiving the first and second data, correlating the first and second data into one or more application sessions, wherein data correlated with a first application session is first application session data, identifying a temporal order relationship of said first application session data; and determining the disparity between the first and second clocks using a time of capture of said first application session data and said temporal order relationship of said first application session data.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
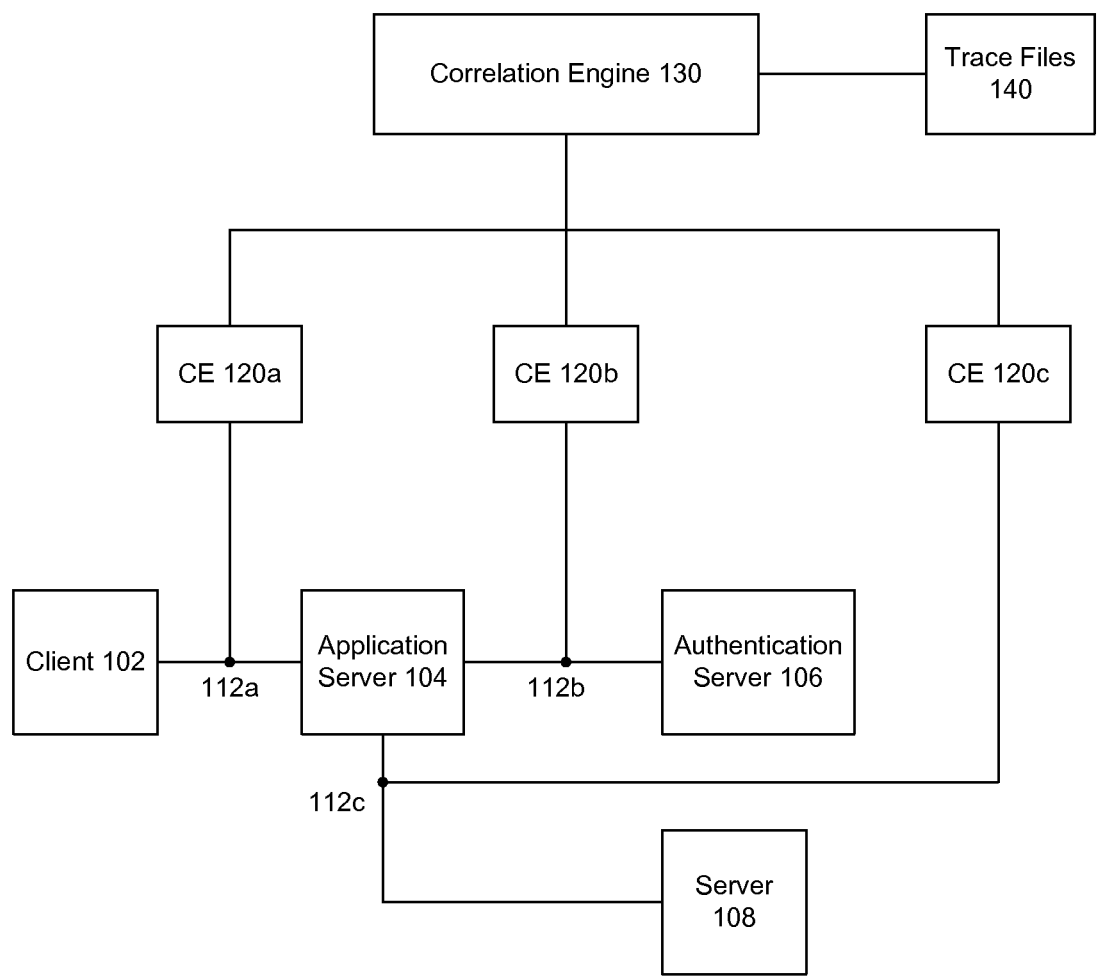
FIG. 1 is an illustration of a multi-tiered network in accordance with one embodiment of the present invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/ programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

As described above, in multi-tiered applications in multi-segment networks, multiple network captures need to be performed by multiple capture agents whose clocks need to be synchronized, e.g., correlated, to a precision necessary to reliably put the network data (e.g., packets, frames etc,) captured by different agents in the correct temporal sequence and to evaluate time delays. For ease of discussion the terms data packets and frames are used interchangeably herein although the invention can work with data of various formats and these terms are intended to include all such formats.

The invention is a system and method for correcting clock discrepancy in simultaneous network traffic data captures. The invention uses intrinsic constraints imposed by the nature of the traffic onto the possible temporal sequence of the packets. One example is a request packet and its corresponding response packet. If a first trace (data capture at a first position) is closer to a first client then a second trace (data capture at a second position) then the request packet must be seen earlier on the first trace and the response packet must be seen earlier on the second trace. In a multi-tiered application where a data packet is not seen on all segments (legs), one example of which is where the multi-tiered application involves a first client that requests data from a first server and where the first server requests authentication from an authentication server and only after receiving authentication does the first server send a respond packet to the first client. The invention uses the intrinsic restraints of the network architecture and the protocols used at each segment along with the time stamps in the various segments to determine both an offset and scale correction to the clock readings (timestamps) in the traces in order to obtain a correct temporal sequence of packets when using multiple capture agents (engines).

FIG. 1 is an illustration of a multi-tiered network in accordance with one embodiment of the present invention. A conventional Client device 102 can include a processor, memory, storage, applications/programs and is coupled to an Application server 104. The application server 104 can be a conventional server that communicates with the client 102, authentication server 106 and server 108, for example. Communication between the devices (client, servers, capture engines/network monitors) on the network illustrated in FIG. 1 can be direct, over a local area network (LAN) over via wide area network (WAN), or a combination, the communication can be via a wired line or wireless, or a combination and the communication use any communication protocol, e.g., TCP/IP (transmission control protocol (TCP)/Internet protocol (IP)) and the communication between devices (e.g., clients, serves, capture engines/network monitors) can use different protocols. A description of the TCP/IP protocol is found in "TCP/IP protocol suite" by B. Forouzan (McGraw-Hill Higher Education 2003) which is incorporated by reference herein in its entirety.

The capture engines 120a, 120b, 120c capture data transmitted over the communication paths at points 112a, 112b and 112c respectively. The capture engines 120 are described in more detail herein.

Figure 2:
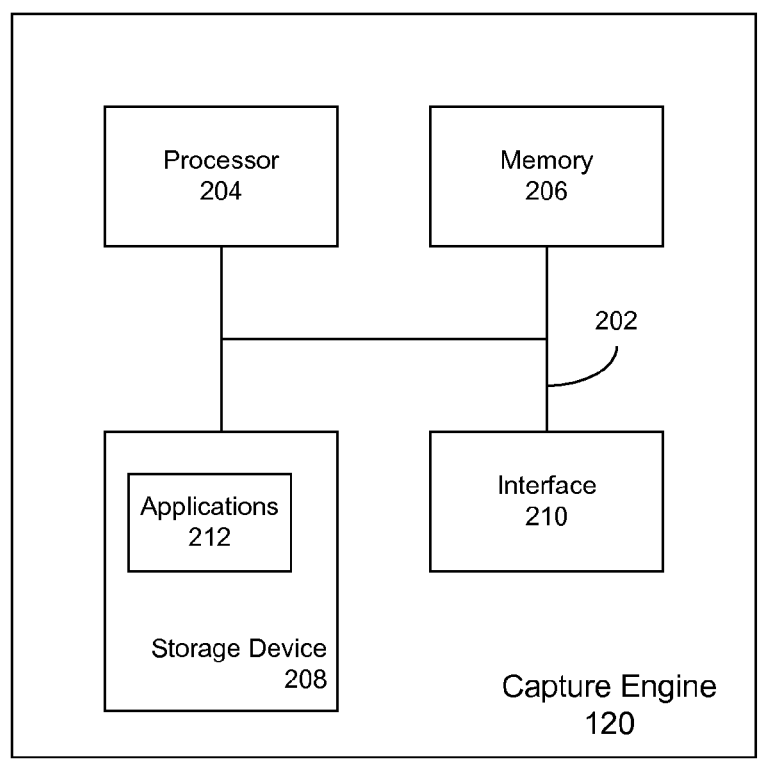
FIG. 2 is a block diagram of a capture engine, according to one embodiment of the present invention.

FIG. 2 is a block diagram of a capture engine 120, according to one embodiment of the present invention. The capture engine 120 may include, among other components, a processor 204, memory 206, a storage module 208, and an interface 210, e.g., an interface for communicating with external systems and/or networks, for example. Applications are executed using processor 204 and can be received via the interface 210, stored in memory 206, stored in a storage device 208 or by using a combination of these elements. In other embodiments, other conventional ways to store and update applications are used. For ease of discussion, in the embodiment illustrated in FIG. 2 applications are stored in the storage device 208. These components are connected and communicate via a bus 202. The capture engine 120 may also include other components such as user input devices (e.g., keyboard and mouse) and display devices (e.g., a display driver card).

The processor 204 executes computer instructions stored in the memory 206 and/or the storage module 208. Although only a single processor is illustrated in FIG. 2, two or more processors may be used to increase the computing capacity and the processing speed of the capture engine 120. In one embodiment, the processor 204 is embodied as two E5400 Xeon Quad-core processors from Intel Corporation of Santa Clara, Calif.

The memory 206 is a computer readable storage medium that stores, among other data, computer instruction modules for processing, storing and/or retrieving the network data. In one embodiment, the memory 206 is a primary storage device (e.g., Random-Access Memory (RAM)) having a faster access speed compared to the storage module 208. In an embodiment, the capture engines 120 are able to capture data at the probe points 112 transparently. That is, without significantly affecting the communication between the devices on either end of the communication path.

The storage module 208 may be a secondary storage device for storing, among others, the raw or processed network data. The storage module 208 may be embodied, for example, as a solid-state drive, hard disk or other memory devices capable of storing a large amount of data compared to the memory 206. In one embodiment, the network data received at the capture engine 120 are stored and then deleted on a first-in-first-out (FIFO) basis.

The interface 210 may include a NIC (network interface card) or other standard network interfaces to receive network data, and to communicate with other network interface devices coupled to a network. For example, the interface 210 may be an Ethernet interface, a WiFi (IEEE 802.11) interface, or other types of wired or wireless network interfaces. In one embodiment, two or more network interfaces may be used to communicate with different types of networks or perform specialized functions.

The components of the capture engine 120 of FIG. 2 are merely illustrative. In alternative embodiments, the storage module 208, for example, may be omitted. In this embodiment, all the information is stored in the memory 206.

In one embodiment, the capture engine 120 is embodied as InfiniStream appliance that is available from NetScout Systems of Westford, Mass. Additional details can be found in U.S. Patent application 61/224,764 filed on Jul. 10, 2009 and U.S. patent application Ser. No. 12/703,086 filed on Feb. 9, 2010 entitled "Intelligent Slicing of Monitored Network Packets for Storing" by Nadkarni et al. which are both incorporated by reference herein in their entirety.

Figure 4:
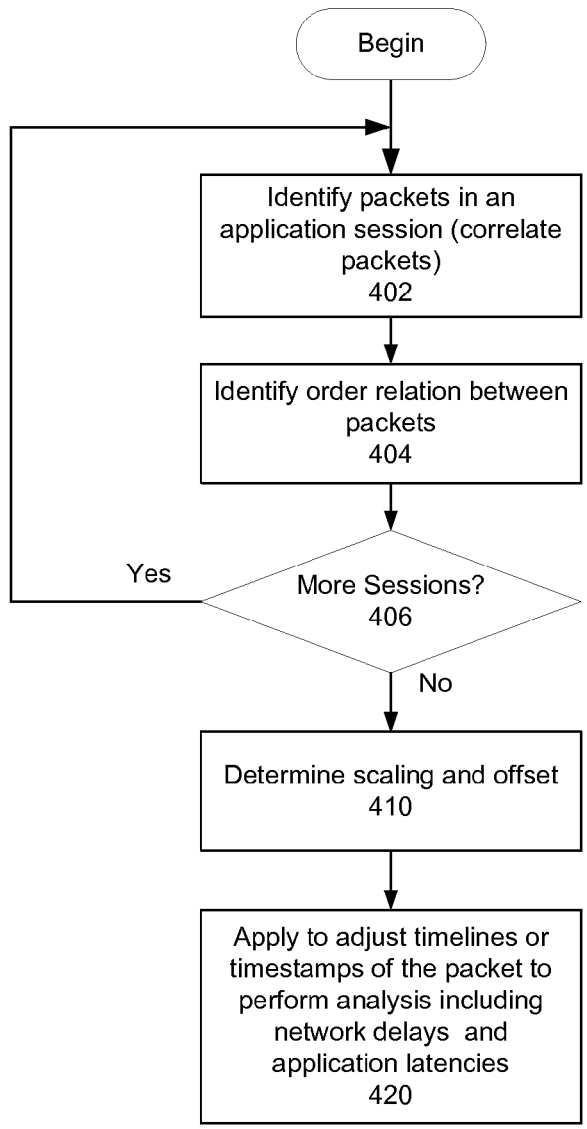
FIG. 4 is a flowchart showing the operation of one embodiment of the present invention.

The operation of one embodiment of the present invention is described in FIG. 4 with reference to the other figures. As described above the present invention is used in multi-tier network in which multiple related sessions using multiple protocols can be tracked. A problem associated with troubleshooting multi-tier networks involves tracing paths of communication units (referred to as packets herein for ease of description although any type of communication unit can be used) delays and transformations across the network as well as correlating multiple segments (legs) of complex sessions involving multiple interdependent devices, such as client 102, application server 104, authentication server 106 and server 108. Two or more of these devices may be cooperating in servicing a client request. Such network captures frequently need to be performed by multiple capture agents, e.g., capture engines 120a, 120b, 120c, whose clocks can not be synchronized (correlated) to the precision needed to reliably put the packets captured by different agents in the correct temporal sequence and evaluate time delays.

The present invention is a system and method for correcting clock discrepancy in simultaneous and/or near simultaneous network traffic data captures. The invention uses intrinsic constraints imposed by the nature of the traffic onto the possible temporal sequence of the packets. In a multi-tiered application, a data packet is not seen on all segments (legs) because when a packet is received by a server it terminates the packet and creates a new packet that is sent to another network device. For example, if a packet sent by client 102 and is received by application server 104, then application server 104 terminates the received packet, strips the appropriate OSI layer header off and creates a new packet having a different header. Alternatively, the server 104 receives a request from a client 102 and issues a new request to a downstream server using a different protocol. Therefore packets captured by capture agents (capture engines 120) at different segments, e.g., captured at points 112a, 112b or 112c, of the network do not have the same packets, even when the underlying signal or data is the same. Therefore, it is difficult to determine the temporal sequence of packets that are captured in different segments.

As described above the present invention attempts to solve this problem and in order to do so the present invention needs to be able to synchronize or correlate, i.e., identify the discrepancies between, the clocks in each of the capture agents to properly identify the temporal sequence of packets in a multi-tier, multi-segment network.

Figure 3:
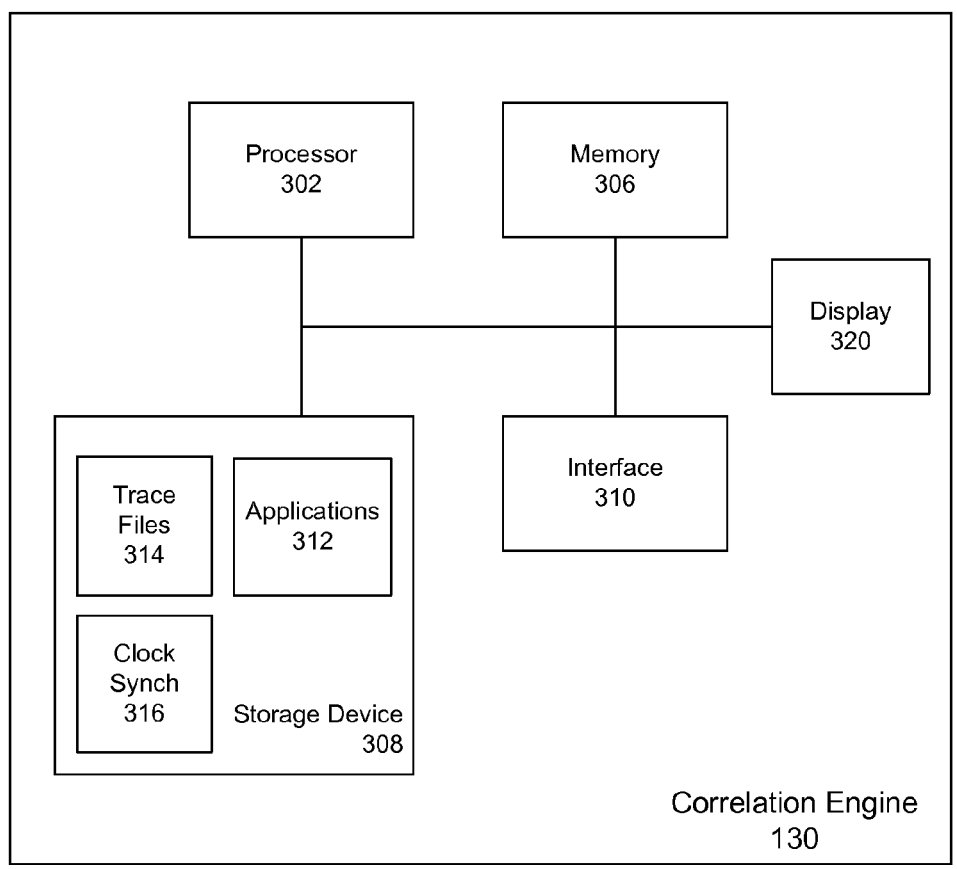
FIG. 3 is an illustration of the correlation engine in accordance with one embodiment of the present invention.

The capture engines 120a, 120b, 120c capture packets at points 112a, 112b and 112c respectively in the network. The capture packets can be stored locally and/or sent to the correlation engine 130. FIG. 3 is an illustration of the correlation engine in accordance with one embodiment of the present invention. The correlation engine 130 includes a processor 304, a storage device 308, memory 304 and applications 312, that in one embodiment are stored in the storage device 308 and/or memory 306 that are executed by the processor 304. The correlation engine 130 also includes an interface 310, e.g., an interface for communicating with external systems and/or networks, for example. Applications are executed using processor 304 and can be received via the interface 310, stored in memory 306, stored in a storage device 308 or a by using a combination of these elements. In other embodiments, other conventional ways to store and update applications are used. For ease of discussion, in the embodiment illustrated in FIG. 3 applications 312 are stored in the storage device 203. These components are connected and communicate via a bus 302. The capture engine 130 may also include other components such as user input devices (e.g., keyboard and mouse) and display devices (e.g., a display driver card), a display device 320 can be incorporated into the correlation engine 130 or connected thereto.

Trace data that can be used to determine the clock correction in accordance with the present invention can be stored in a trace file 314 either from previous captured data or can be stored in the storage device 308 or the memory 306 (or some storage device external to the correlation engine 130, e.g., trace files 140) and the data is used by the clock synchronization system 316, which in this example and for ease of discussion is stored in the storage device although the clock synchronization system 316 can be stored in the memory 306 or external to the correlation engine 130 in manners similar to the applications 312, for example.

The processor 304 executes computer instructions stored in the memory 306 and/or the storage module 308. Although only a single processor is illustrated in FIG. 3, two or more processors may be used to increase the computing capacity and the processing speed of the correlation engine 130. In one embodiment, the processor 304 is embodied as two E5400 Xeon Quad-core processors from Intel Corporation of Santa Clara, Calif.

The memory 306 is a computer readable storage medium that stores, among other data, computer instruction modules for processing, storing and/or retrieving the network data. In one embodiment, the memory 306 is a primary storage device (e.g., Random-Access Memory (RAM)) having a faster access speed compared to the storage module 308. In an embodiment, the correlation engines 130 are able to receive data from the capture engines 120 directly or the data from the capture engines can be stored in trace files 140, 314.

The storage module 308 may be a secondary storage device for storing, among others, the raw or processed network data. The storage module 308 may be embodied, for example, as a solid-state drive, hard disk or other memory devices capable of storing a large amount of data compared to the memory 306. In one embodiment, the network data received at the correlation engine 130 are stored and then deleted on a first-in-first-out (FIFO) basis.

The interface 310 may include a NIC (network interface card) or other standard network interfaces to receive network data, and to communicate with other network interface devices coupled to a network. For example, the interface 310 may be an Ethernet interface, a WiFi (IEEE 802.11) interface, or other types of wired or wireless network interfaces. In one embodiment, two or more network interfaces may be used to communicate with different types of networks or perform specialized functions.

The components of the correlation engine 130 of FIG. 3 are merely illustrative. In alternative embodiments, the storage module 308 may be omitted, for example.

With reference to FIG. 4, the correlation engine 130 identifies 402 packets in an application session. This is accomplished by correlating the packets. Packets are correlated by the correlation engine, for example, that identifies those packets that are part of a single application session. For example, correlating packets can involve analyzing the header information of packets to identify the type of data in the packet. Using this information and combining it with the protocols used between the devices enables the correlation engine 130 to identify the session to which packets belong. For example, if a session is identified as using the POP3 (Post Office Protocol) email exchange, then the correlation engine knows that a TCP connection is needs to be established and includes first sending a TCP synchronization (SYN) message, then the device receiving this SYN message responds with a TCP synchronization and acknowledgement (SYN+ACK) message which then results in an acknowledgement (ACK) signal. From the knowledge of the various protocols that are used in the system the correlation engine 130 identifies packets as belonging to a particular session, in the above example, it would be a POP3 email session.

The details of the various protocols are known to those of ordinary skill in the art and it will be apparent that the present invention can recognize many different protocols and messages within these protocols in order to identify 402 packets in an application session. Some examples of networking protocols are found at www.eventhelix.com. Other techniques for correlating packets (identifying sessions on different legs/segments as being related) are known to those skilled in the art. Correlating sessions can also involve inspecting payloads of packets and utilizing the knowledge of the protocols to identify relations, e.g., relating an client request with an authentication request.

Examples of the protocols that the correlation engine 130 can use to identify packets in a particular session include: Open Systems Interconnection (OSI) Layer 1 protocols such as ADSL (Asymmetric digital subscriber line), ISDN (Integrated Services Digital Network), PDH (Plesiochronous Digital Hierarchy), T-carrier (T1, T3, etc.), E-carrier (E1, E3, etc.), RS-232 (a serial line interface originally developed to connect modems and computer terminals), SDH (Synchronous Digital Hierarchy), SONET (Synchronous Optical NETworking), Modem standards/ITU V-Series (protocols used to communicate between analog modems over voice telephone lines), ITU-T G.hn Physical Layer.

OSI Layer 1/2 protocols such as Ethernet, GFP ITU-T G.7041 (Generic Framing Procedure), OTN ITU-T G.709 (Optical Transport Network also called Optical Channel Wrapper or Digital Wrapper Technology).

OSI Layer 2 protocols such as: ARCnet (Attached Resource Computer NETwork), CDP (Cisco Discovery Protocol), DCAP (Data Link Switching Client Access Protocol), Dynamic Trunking Protocol, Econet, FDDI (Fiber Distributed Data Interface), Frame Relay, ITU-T G.hn Data Link Layer, HDLC (High Level Data Link Control), IEEE 802.11 (WiFi), IEEE 802.16 (WiMAX), LocalTalk, L2F (Layer 2 Forwarding Protocol), L2TP (Layer 2 Tunneling Protocol), LAPD (Link Access Procedures on the D channel), LLDP (Link Layer Discovery Protocol), LLDP-MED (Link Layer Discovery Protocol-Media Endpoint Discovery), PPP (Point-to-Point Protocol), PPTP (Point-to-Point Tunneling Protocol), Q.710 (Simplified Message Transfer Part), NDP (Neighbor Discovery Protocol), RPR IEEE 802.17 (Resilient Packet Ring), StarLAN, STP (Spanning Tree Protocol), Token ring, VTP VLAN Trunking Protocol.

OSI Layer 2/3 protocols such as: ATM (Asynchronous Transfer Mode), Frame relay (simplified version of X.25), MPLS (Multi-protocol label switching), X.25, ARP (Address Resolution Protocol), RARP (Reverse Address Resolution Protocol).

OSI Layer 1/2/3 protocols such as: MTP (Message Transfer Part), NSP (Network Service Part).

OSI Layer 3 protocols such as: CLNP (Connectionless Networking Protocol), EGP (Exterior Gateway Protocol), EIGRP (Enhanced Interior Gateway Routing Protocol), ICMP (Internet Control Message Protocol), IGMP (Internet Group Management Protocol), IGRP (Interior Gateway Routing Protocol), IPv4 (Internet Protocol version 4), IPv6 (Internet Protocol version 6), IPSec (Internet Protocol Security), IPX (Internetwork Packet Exchange), SCCP (Signaling Connection Control Part), AppleTalk DDP, IS-IS (Intermediate system to intermediate system), OSPF (Open Shortest Path First), BGP (Border Gateway Protocol), RIP (Routing Information Protocol), ICMP (Router Discovery Protocol: Implementation of RFC 1256), GDP (Gateway Discovery Protocol, a Cisco protocol similar to IRDP), HIP (Host Identity Protocol), Xerox Network Systems.

OSI Layer 4 protocols such as: AHAH (Authentication Header over IP or IPSec), ESPESP (Encapsulating Security Payload over IP or IPSec), GRE (Generic Routing Encapsulation for tunneling), IL (Originally developed as transport layer for 9P), SCTP (Stream Control Transmission Protocol), Sinec H1 (for telecontrol), SPX (Sequenced Packet Exchange), TCP (Transmission Control Protocol), UDP (User Datagram Protocol).

OSI Layer 5 protocols such as: 9P (Distributed file system protocol developed originally as part of Plan 9), NCP (NetWare Core Protocol), NFS (Network File System), SMB (Server Message Block), SOCKS (SOCKetS).

OSI Layer 7 protocols such as: AFP (Apple Filing Protocol), BACnet (Building Automation and Control Network protocol), BitTorrent (A peer-to-peer file sharing protocol), BOOTP (Bootstrap Protocol), Diameter (an authentication, authorization and accounting protocol), DICOM (includes a network protocol definition), DICT (Dictionary protocol), DNS (Domain Name System), DHCP (Dynamic Host Configuration Protocol), ED2K (A peer-to-peer file sharing protocol), FTP (File Transfer Protocol), Finger (which gives user profile information), Gnutella (a peer-to-peer file-swapping protocol), Gopher (a hierarchical hyperlinkable protocol), HTTP (HyperText Transfer Protocol), IMAP (Internet Message Access Protocol), Internet Relay Chat (IRC), ISUP (ISDN User Portion), XMPP (an instant-messaging protocol), LDAP (Lightweight Directory Access Protocol), MIME (Multipurpose Internet Mail Extensions), MSNP (Microsoft Notification Protocol—used by Windows Live Messenger), MAP (Mobile Application Part), NetBIOS (File Sharing and Name Resolution protocol—the basis of file sharing with Windows), NNTP (News Network Transfer Protocol), NTP (Network Time Protocol), NTCIP (National Transportation Communications for Intelligent Transportation System Protocol), POP3 (Post Office Protocol Version 3), RADIUS (authentication, authorization and accounting protocol), Rlogin (a UNIX remote login protocol), rsync (a file transfer protocol for backups, copying and mirroring), RTP (Real-time Transport Protocol), RTSP (Real-time Transport Streaming Protocol), SSH (Secure Shell), SISNAPI (Siebel Internet Session Network API), SIP (Session Initiation Protocol, a signaling protocol), SMTP (Simple Mail Transfer Protocool), SNMP (Simple Network Management Protocol), SOAP (Simple Object Access Protocol), STUN (Session Traversal Utilities for NAT), TUP (Telephone User Part), Telnet (a remote terminal access protocol), TCAP (Transaction Capabilities Application Part), TFTP (Trivial File Transfer Protocol, a simple file transfer protocol), WebDAV (Web Dist Authoring and Versioning), DSM-CC (Digital Storage Media Command and Control).

The details of these protocols are publicly available and known to persons of skill in the art and are incorporated by reference herein in their entirety.

After the packets of a single application session are identified, the present invention identifies the temporal sequence of the packets. This can be accomplished in a variety of ways. In one embodiment the protocols utilized between various network components, e.g., client 102, application server 104, authentication server 106 and server 108 are known. Using the known protocols, the invention uses the known relationships between, for example, different setup and communication packets. Since the correlation engine 130 knows the architecture of the system, the protocols between the various network components and the necessary order of various packets within the protocols, the correlation engine 130 is able to infer the temporal order of many of the packets in the application session.

Figure 5:
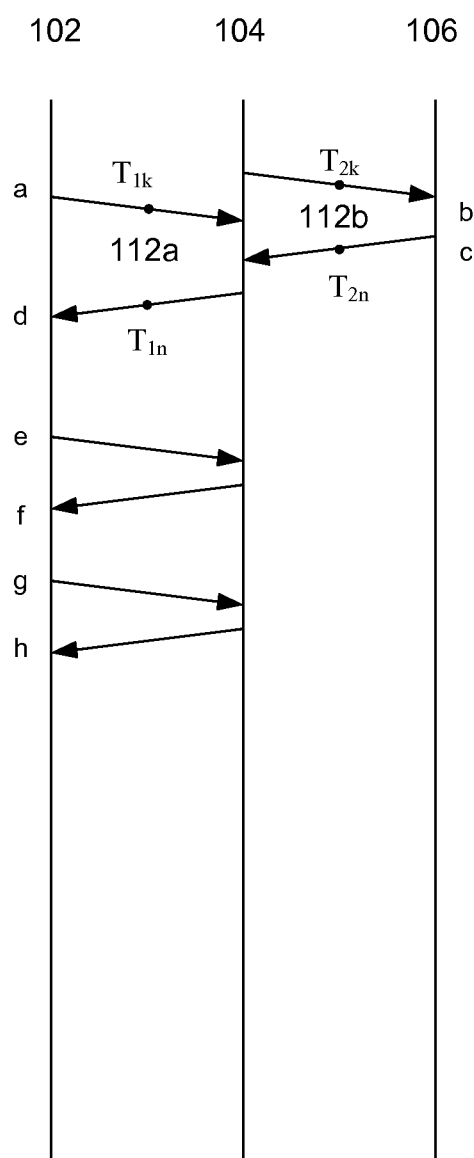
FIG. 5 is an example of a signaling protocol in accordance with one embodiment of the present invention.

One example is illustrated in FIG. 5 is an example of a signaling protocol in accordance with one embodiment of the present invention.

Packets a, b, c and d are shown as they appear according to uncorrected relative times in traces. From the addressing of the packets, we know that their directions are opposite. By using TCP data (ACK and SEQ numbers) we can establish that packet d is a response to packet a and from protocol information we can determine that packet b is in response to packet a. For example, packet a may be a request packet from client 102. Before responding to the request application server 104 needs to authenticate the request and therefore application server 104 sends packet b to authentication server 106. Authentication server 106 uses any conventional authentication procedure and when authentication is complete sends an authentication response packet, e.g., packet c. Once the application server 104 receives packet c it sends a response to client 102, e.g., packet a. Packets e, f, g and h are examples of packets exchanged between the client 102 and application server 104, with packet f responsive to packet e and packet h responsive to packet g.

For each of these packets, the time transmitted is known and the time that the packet is captured by the capture engine 120 is known according to the clock in the corresponding capture engine. As described above, the clocks on the various network devices and capture engines 120 are not precisely synchronized. Due to differences in clocks in different capture engines 120 and network devices, clock discrepancies exist. There are two sources of errors in such clocks (1) offsets and (2) clock skew (scale). The offset error is the absolute difference in two clocks at a particular time and the skew (scaling) error is the rate at which the difference changes.

The requirements of various protocols regarding signaling and communication sequences are known can be determined from the documentation of the protocols, e.g., the messaging order and, as described above, is utilized by the present invention to identify 404 the order/temporal relation between the packets.

The correlation engine then determines 406 whether packets from different sessions have been received or are part of the trace files 314, 140. If additional sessions are present the process continues with another session at step 402.

After the order relation of the packets in an application session is identified 404, and no additional sessions are to be analyzed 406, the clock synchronization module 316 determines 410 the scaling and offset corrections to the clocks of the capture engines 120.

The clock synchronization module 316 operates in a multi-segment, multi-session environment and analyzes situations where more than one trace is taken at different locations by the capture engines 120 in a network and identifies instances of the same packets as seen in different traces. In order to display packets in temporal order, absolute times are assigned to packet instances. For ease of discussion this term is used to denote a packet as seen by a particular capture engine 120, as opposed to an abstract notion of a packet travelling over the network from source to destination while keeping its identity. The capture engines 120 assign times, absolute or relative, e.g., time since capture start, to packets according to each capture engine's 120 hardware clock. However clocks on different capture engines 120 are not exactly synchronized. Moreover, clock speeds in the capture engines 120 may vary slightly to introduce scaling (skew) errors. Even slight variation however is significant compared to millisecond- and submillisecond-range delays between instances of a packet. Using relative times without regard to these clock discrepancies leads to the effect where a packet can be seen downstream before it is seen at an upstream location or a packet appears on one leg with a timestamp earlier than another packet from another leg that must have preceded it, which is unacceptable from the point of view of usability and accuracy. The present invention solves this problem by correcting clock discrepancies in order to correct trace timings (synchronize traces) so that no packet goes (apparently) "back in time," i.e., the present invention presents the situation where the effect does not precede the cause (e.g., a reply does not precede its request).

The clock synchronization algorithm 316 works on a pair of traces, where instances of the same packet have already been identified.

In some situations it may appear, based upon timestamps of the packets, that a packet goes back in time or that a response-type packet occurs before a request-type packet. For example, packet a is received by capture engine 120a at point 112a at time $T_{1k}$. Packet b in this example is correlated to packet a, e.g., packet b is an authentication request that is sent in response to receiving packet a. However, packet b is received by capture engine 120b at point 112b at time $T_{1n}$, which is prior to $T_{1k}$. The cause of this is a discrepancy between the clocks in client 102 and application server 104.

To correct this, the present invention adjusts for errors in the offset ($\tau$) and the scaling coefficient ($\alpha$) as shown below. The present invention then applies correction factor (T) for each timestamp on one of the devices, e.g., client 102 or application server 104 in this example.

$$T \rightarrow \alpha T + \tau$$

This equation is determined with parameters $\alpha$ and $\tau$ being constants for a particular pair of capture engines 120 or network devices (common for all packets) and are to be determined with the condition that no packet can precede another packet that must have occurred earlier.

To this end, the clock synchronization module 316 uses the following process. Equations (1) and (2) represent the condition that no packet can precede another packet that must have occurred earlier. In the notation of FIG. 5, $$T_{1k} < \alpha \cdot T_{2k} + \tau \quad (1)$$

$$T_{1n} > \alpha \cdot T_{2n} + \tau \quad (2)$$

This is because packet b must have occurred after packet a, and packet d must have occurred after packet c according to the logic of the application. This large system of inequalities generally defines a domain in the ($\alpha$, $\tau$)-plane, in the shape of a finite convex polygon (see FIG. 6). Convexity follows from the fact that it is an intersection of a number of half-planes. Finiteness follows from the physics of the problem: if sufficiently large values are assigned to either of the parameters, a second trace will inevitably shift too much, in either direction, so that there will be packets moving back in time. Note that the present invention can, but does not need to, know all the solutions to the problem, one is sufficient, especially if it does not lie on the boundary of the polygon. Thus, the present invention proceeds to determine two diametrically opposite points on the boundary of the solution domain, and can take any point between them, e.g., a point substantially in the middle, as the close-to-optimal solution (this point lies in the solution domain due to its convexity).

From each pair of packets for which there exists a timing constraint due to the architecture of the particular application, i.e., for which one packet must have occurred before the other, as in (1, 2), we can deduce:

$$T_{1n} - \alpha \cdot T_{2n} < \tau < T_{1k} - \alpha \cdot T_{2k}$$

Which yields an inequality for $\alpha$ only as shown in equations (3) or (4):

$$\alpha > \frac{T_{1n} - T_{1k}}{T_{2n} - T_{2k}}, \text{ if } T_{2n} - T_{2k} > 0, \text{ or} \quad (3)$$

$$\alpha < \frac{T_{1n} - T_{1k}}{T_{2n} - T_{2k}}, \text{ if } T_{2n} - T_{2k} < 0 \quad (4)$$

In the same way, inequalities (1, 2) yield inequalities for $\tau$ only by elimination of $\alpha$ as shown in equations (5) or (6), $$T_{1k}T_{2n} - \tau T_{2n} > \alpha > T_{1n}T_{2k} - \tau T_{2k}, \text{ that is:}$$

$$\tau > \frac{T_{1k}T_{2n} - T_{1n}T_{2k}}{T_{2n} - T_{2k}}, \text{ if } T_{2n} - T_{2k} > 0 \text{ or} \quad (5)$$

$$\tau < \frac{T_{1k}T_{2n} - T_{1n}T_{2k}}{T_{2n} - T_{2k}}, \text{ if } T_{2n} - T_{2k} < 0 \quad (6)$$

The clock synchronization module 316 then determines the pairs (n, k) that define the strictest bounds for $\tau$, i.e., the greatest lower bound in (5) and smallest higher bound in (6). These, with corresponding values for a, define the sought-for points on the boundary of the solution domain. Alternatively, the clock synchronization module 316 can determine the strictest bounds for $\alpha$, and take corresponding values for $\tau$. That would provide, possibly, a different solution.

Figure 6:
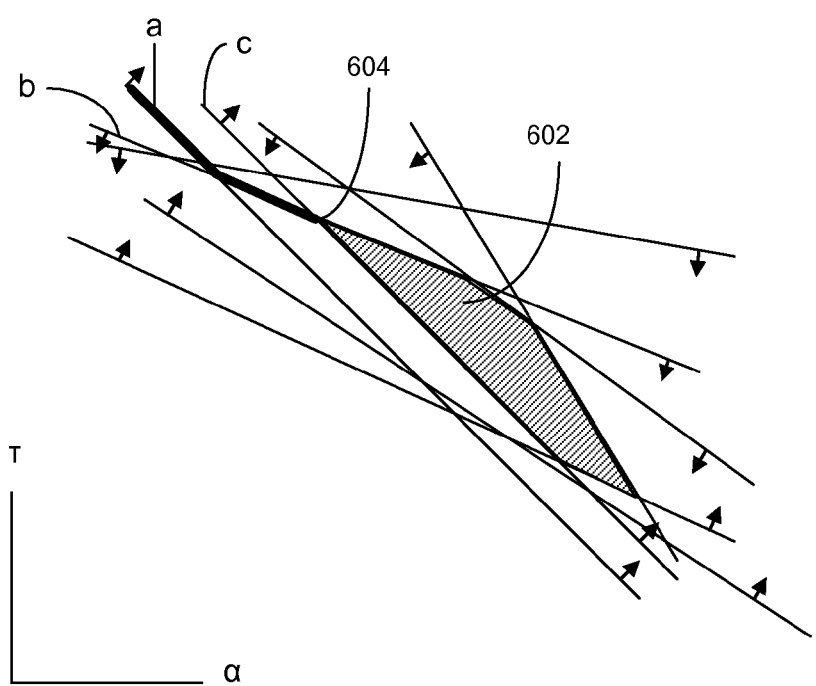
FIG. 6 is an illustration of a domain in the (α, τ)-plane, in the shape of a finite convex polygon, in accordance with one embodiment of the present invention.

Another method would be to compare all possible pairs of opposite-traveling packets. Yet another and more efficient method is described with reference to FIG. 6. FIG. 6 is an illustration of a domain in the ($\alpha$, $\tau$)-plane, in the shape of a finite convex polygon, in accordance with one embodiment of the present invention. Each line represents an inequality, with arrows pointing to the correct half-plane. The solution domain, the intersection of all half-planes, is represented by a hashed polygon 602. In order to find, for example, its leftmost corner (denoted by point 604 in FIG. 6), the clock synchronization module 316 performs the following steps:

$\tau$ 1. select an arbitrary line (say, line a in FIG. 6)
2. if the line defines the upper half-plane, find all its intersections with lower-half-plane lines, and vice versa
3. select the rightmost intersection point and the corresponding line (line b in FIG. 6)
4. with this new line, repeat step 2, unless line b already was selected right before a, in which case the solution is found The rightmost corner of the solution domain can be found in the same way.

As described above, a scaling and offset value within the allowable range 602 is used, and is applied 420 to adjust the timelines or timestamps of the packet to perform analysis including network delays and application latencies.

By applying the time correction value (T) the present invention corrects clock discrepancy in simultaneous network traffic data captures. As described above, the invention uses intrinsic constraints imposed by the nature of the traffic onto the possible temporal sequence of the packets. One example is a request packet and its corresponding response packet. If a first trace (position of data capture) is closer to a first client then a second trace then the request packet must be seen earlier on the first trace and the response packet must be seen earlier on the second trace. In a multi-tiered application where a data packet is not seen on all segments (legs) one example is where the multi-tiered application involves a first client that requests data from a first server and where the first server requests authentication from an authentication server and only after receiving authentication does the first server send a respond packet to the first client. The invention uses the intrinsic restraints of the network architecture and the protocols used at each segment along with the time stamps in the various segments to determine both an offset and scale correction to the clock readings (timestamps) in the traces in order to obtain a correct temporal sequence of packets when using multiple capture agents (engines).

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for determining clock disparities between a first clock in a first network monitor positioned to capture first data in a first segment of a network and a second clock in a second network monitor positioned to capture second data in a second segment of the network, the first and second data transmitted using at least one network transmission protocol, and the first and second network segments in different tiers of a multi-tiered network system, the method comprising the steps of:

receiving the first and second data, a packet of the first data traveling through a first network path of the multi-tiered network system and a packet of the second data traveling through a second network path of the multi-tiered network system different from the first network path, the traveling through the multiple tiers of the network system including terminating the packets of the first data and of the second data at a tier of the multi-tier system;

correlating the first and second data into one or more application sessions, wherein data correlated with a first application session is first application session data that includes packets from both the first data and the second data;

identifying a correct temporal sequence of said first application session data responsive to the at least one network transmission protocol and restraints of the multi-tiered network architecture, the restraints to which the identifying is responsive including locations in the multi-tiered network structure of the first and the second network monitors; and determining the disparity between the first and second clocks by comparing timestamps of said first application session data with said correct temporal sequence of said first application session data and accounting for the disparity when analyzing data captured by at least one of said first network monitor and said second network monitor wherein the disparity corresponds to an offset value and a scaling value wherein said offset value and said scaling value is utilized when analyzing data captured by at least one of said first network monitor and said second network monitor.

2. The method of claim 1, wherein said first segment is between a first pair of devices in the network and a second segment is between a second pair of devices in the network wherein said first pair and second pair are different.

3. The method of claim 1, wherein the identifying step includes the step of utilizing a first application protocol corresponding to the first application session to identify the correct temporal sequence.

4. A non-transitory computer readable storage medium structured to store instructions, to determine clock disparities between a first clock in a first network monitor positioned to capture first data in a first segment of a network and a second clock in a second network monitor positioned to capture second data in a second segment of the network, the first and second data transmitted using at least one network transmission protocol, and the first and second network segments being in different tiers of a multi-tiered network system, the instructions when executed cause a processor to perform operations including:

receiving the first and second data, a packet of the first data traveling through a first network path of the multi-tiered network system and a packet of the second data traveling through a second network path of the multi-tiered network system different from the first network path, the traveling through the multiple tiers of the network system including terminating the packets of the first data and of the second data at a tier of the multi-tier system;

correlating the first and second data into one or more application sessions, wherein data correlated with a first application session is first application session data that includes packets from both the first data and the second data;

identifying a correct temporal sequence of said first application session data responsive to the at least one network transmission protocol and restraints of the multi-tiered network architecture, the restraints to which the identifying is responsive including locations in the multi-tiered network structure of at least the first and the second network monitors; and determining the disparity between the first and second clocks by comparing timestamps of said first application session data with said correct temporal sequence of said first application session data and accounting for the disparity when analyzing data captured by at least one of said first network monitor and said second network monitor wherein the disparity corresponds to an offset value and a scaling value wherein said offset value and said scaling value is utilized when analyzing data captured by at least one of said first network monitor and said second network monitor.

5. The non-transitory computer readable storage medium of claim 4, wherein said first segment is between a first pair of devices in the network and a second segment is between a second pair of devices in the network wherein said first pair and second pair are different.

6. The non-transitory computer readable storage medium of claim 4, wherein the identifying instruction includes the instruction of utilizing a first application protocol corresponding to the first application session to identify the correct temporal sequence order relationship.

* * * * *